United States Patent
Popp et al.

(10) Patent No.: US 10,962,722 B2
(45) Date of Patent: Mar. 30, 2021

(54) COMPACT MULTICHANNEL OPTICAL ROTARY JOINT

(71) Applicant: Schleifring GmbH, Fürstenfeldbruck (DE)

(72) Inventors: Gregor Popp, Munich (DE); Jacques Abenhaim, Fürstenfeldbruck (DE)

(73) Assignee: Schleifring GmbH

( * ) Notice: Subject to any disclaimer, the term of this patent is extended or adjusted under 35 U.S.C. 154(b) by 0 days.

(21) Appl. No.: 17/017,306

(22) Filed: Sep. 10, 2020

(65) Prior Publication Data

US 2021/0063648 A1 Mar. 4, 2021

Related U.S. Application Data

(63) Continuation of application No. PCT/EP2019/056218, filed on Mar. 13, 2019.

(30) Foreign Application Priority Data

Mar. 16, 2018 (EP) .................................. EP18162195

(51) Int. Cl.
*G02B 6/36* (2006.01)
(52) U.S. Cl.
CPC .................................. *G02B 6/3604* (2013.01)
(58) Field of Classification Search
CPC .................................................. G02B 6/3604
See application file for complete search history.

(56) References Cited

U.S. PATENT DOCUMENTS

| | | | |
|---|---|---|---|
| 5,157,745 A | 10/1992 | Ames | |
| 5,176,331 A | 1/1993 | Horne | |
| 5,271,076 A | 12/1993 | Ames | |
| 5,371,814 A | 12/1994 | Ames | |
| 5,442,721 A | 8/1995 | Ames | |
| 7,876,985 B2 | 1/2011 | Popp | |
| 8,965,151 B1 * | 2/2015 | Zhang | G02B 6/3604 385/26 |
| 2007/0184934 A1 | 8/2007 | Zhang | |

FOREIGN PATENT DOCUMENTS

WO 2007010362 A2 1/2007

* cited by examiner

*Primary Examiner* — Sung H Pak
*Assistant Examiner* — Hoang Q Tran
(74) *Attorney, Agent, or Firm* — Yakov Sidorin; Quarles & Brady LLP

(57) ABSTRACT

An optical rotary joint having a housing, a hollow shaft, a bevel gear, a prism and two collimators. The housing includes two sections, each holding a collimator and separated by a gap in an axial direction from each other and rotatable against each other and around the center axis. The hollow shaft is aligned with the center axis, and has two ends extending into the housing sections. The housing sections are supported via bearings by the hollow shaft. The hollow shaft further contains a prism holder with a Dove prism. The bevel gear is located in the gap between the housing sections and includes two wheels at the housing sections in mesh with two third wheels, which have an axis oriented radially to the center axis and fixedly attached to the hollow shaft, such that a rotation of the housing sections against each other results in a rotation of the hollow shaft with half of the angular speed.

15 Claims, 3 Drawing Sheets

COMPACT MULTICHANNEL OPTICAL ROTARY JOINT

CROSS-REFERENCE TO RELATED APPLICATIONS

This application is a continuation of pending International Application No. PCT/EP2019/056218 filed on 13 Mar. 2019, which designates the United States and claims priority from European Application No. 18162195.4 filed on 16 Mar. 2018. The disclosure of each of the above-mentioned patent applications is incorporated by reference herein.

BACKGROUND

1. Field of the Invention

The invention relates to multi-channel rotary joints for optical signals. Such rotary joints a capable of simultaneously coupling a plurality of optical signals between two devices that are rotatable against each other.

2. Description of Relevant Art

Optical rotary joints for simultaneous coupling of a plurality of optical signals between two units, which are rotatable against each other, may have a derotating element. Such a derotating element may be a Dove prism that is rotated with half the angular speed of the relative rotation of the two units. In such a case, on both sides of the Dove prism optical collimators are provided for forming optical beam. The collimators form a parallel beam of light from the light coupled by an optical fiber, and provide an increased beam diameter (which is significantly larger than the fiber diameter).

WO 2007/010362 A2, US 2007/0184934 A1, U.S. Pat. Nos. 5,371,814 and 5,271,076 disclose such a multi-channel fiber optic rotary joint, where a Dove prism is held rotatably within an outer housing. The design is optimized for a shortest-possible optical path between the two collimators, such that mechanical tolerances (and specifically those for the alignment of the collimators and the Dove prism) have the smallest-possible effect on signal transmission or attenuation. Therefore, the collimators are mounted as close as possible on both sides of the Dove prism.

U.S. Pat. No. 5,157,745 discloses a further multi-channel fiber optic rotary joint. Here, cylindrical lenses and lateral adjustors are provided to compensate for mechanical tolerances of the collimators and the Dove prism.

U.S. Pat. No. 5,176,331 discloses a rotation compensation device for a cable drum.

U.S. Pat. No. 5,442,721 discloses a comparatively short rotary joint using all lens collimators. A very important aspect of these rotary joints is their comparatively short optical path which helps to minimize the adverse effects of angular deviation of the optical paths and therefore reduces coupling losses.

The optical fibers attached to the collimators typically leave the housings parallel to the rotation axis. There are alternative designs where the fibers are bent by 90 degrees to leave the housing perpendicular/orthogonal to the rotational axis. Since optical fibers are available that allow a tight bending radius of e.g. 2.5 mm at tolerable attenuation increase and life time reduction this is a solution allowing short collimators with small dimension in axial direction. Other implementations are disclosed in U.S. Pat. No. 7,876,985B2.

SUMMARY

The embodiments are providing a multi-channel rotary joint, which has a comparatively small outer diameter. The joint may have comparable or even lower coupling losses than the rotary joints known from prior art. Therefore, the rotary joint should provide a high mechanical and optical precision and therefore comparatively low mechanical tolerances. Manufacturing and assembly should be easy and simple, keeping the overall costs low. Furthermore, the design should be usable for high rotational speeds.

Solutions of the problem are described in the independent claims. The dependent claims relate to further improvements of the invention.

In a first embodiment, an optical rotary joint includes a housing, a hollow shaft, a bevel gear, a derotating element such as a prism, and two collimators. The rotary joint has a center axis. The housing includes two housing sections which are separated by a gap in an axial direction. The gap is dimensioned to be large enough to accommodate and hold the bevel gear, as will be shown later. The housing sections are rotatable against each other around the center axis. The first housing section has in axial direction (direction of the center axis), a first inner side, and a first outer side. The second housing section has in axial direction, a second inner side, and a second outer side. The first inner side of the first housing section is oriented towards the second inner side of the second housing section. The outer sides of the housings may bear collimators, such that a first collimator is arranged at the first outer side of the first housing section, and a second collimator is arranged at the second outer side of the second housing section.

The hollow shaft is arranged essentially within the housing sections and aligned with the center axis. The hollow shaft has a first end (which extends into the first housing section) and a second end (which extends into the second housing section). The first housing section is supported on the first end of the shaft by at least one bearing. In related embodiments, there may be two, three or four bearings. The second housing section is supported on the second end of the shaft by at least one bearing. In related embodiments, there may be two, three or four bearings. Furthermore, the first housing may in addition be supported by at least one bearing. In related embodiments, there may be two, three or four bearings on the second end of the shaft. The hollow shaft further has a prism holder between the first and the second end. The prism holder may be located within the first housing section.

The bevel gear is located in the gap between the first housing section and the second housing section and includes three wheels. A first wheel is at the first inner side of the first housing section. A second wheel is at the second inner side of the second housing section. At least one third wheel is arranged such that it meshes with the first wheel and the second wheel. The first and second wheels are coaxial to the center axis and opposing each other, such that the first wheel opposes the second wheel. The first wheel and the second wheel may have the same diameter. They may have the same size. In one embodiment, they are identical to each other. The at least one third wheel has an axis that is oriented radially to the center axis. Such axis is fixedly attached to the hollow shaft or is one part with the hollow shaft. Therefore, when the housing sections are rotated against each other, causing the first and the second wheel to rotate, the third wheel will also rotate and generate a rotation of the hollow shaft around the center axis. The rotational speed of the hollow shaft is chosen to be precisely half the speed of the housing sections relative to each other. Furthermore, the bevel gear is displaced in an axial direction from the prism holder, such that the axis of the third wheel in connection with the hollow shaft is short, and the third wheel is close to the hollow shaft. This allows to keep the outer diameter of the rotary joint small. Actually, the bevel gear may be built and structured such, that the Dove prism, which is located in the prism holder outer the hollow shaft, is the largest component and defines the outer diameter of the whole rotary joint. For the best precision, at least one bearing is disposed on each side of the prism holder. Furthermore, there may be at least one bearing on each side of the bevel gear. Furthermore, depending on the specifics of particular implementation, either one bearing may be disposed in a particular housing section, or two bearings may be disposed within each housing section.

As the prism in the prism holder and the bevel gear are arranged along the hollow shaft (and therefore are separated from one another in an axial direction), the outer diameter of the rotary joint can be minimized to the diameter of the largest component, which usually is the Dove prism according to the idea of this invention. Furthermore, this design is usable to very high rotational speeds, as the overall diameter is very small (in comparison with the gadget discussed in, for example, WO 2007/010362) and, therefore, the centrifugal forces are low. At the same time, as the main extension of the rotary joint is in axial direction along the center axis, the distances between the bearings remain comparatively large, which allows for a stable support of the components without having the risk of tilting or oscillations during operation.

The bevel gear may include only one third wheel, but there may be at least one, two, or a higher number (three or four or more) of third wheels. The third wheels may be arranged equidistantly around the hollow shaft. This even spatial disposition of the third wheels evenly distributes the forces to the hollow shaft and, therefore, increases precision. To avoid oscillation at high rotational speeds, it may be desirable in some cases to have slightly different separation distances between the third wheels.

To increase the compactness of the assembly further, the third wheel may be dimensioned to have a diameter smaller than those of the first and the second wheels. For a compact assembly, the third wheel may also have a simplified bearing, like a friction bearing or a plane bearing. To operate at high rotational speeds, the third wheel may also have a ball bearing.

In one embodiment, the housing has a cylindrical outer contour. The first housing section may have the same outer diameter as the second housing section. In an embodiment, a cover may be provided on the gap which may be connected either the first or the second housing section and rotate freely with respect to the other housing section.

In at least one embodiment, the prism holder is a section of the hollow shaft for holding and/or accommodating the prism. The prism holder may also be configured as part of the hollow shaft itself or be a separate part held by the hollow shaft. Such a separate-part configuration simplifies assembly and may also allow to adjust the prism within the holder before the holder is assembled with the hollow shaft. If the prism holder is a part of the shaft, then the prism may be mounted directly (e.g. by gluing) into the shaft.

In an embodiment, the prism holder has an outer diameter that is larger than the outer diameter(s) of the first end of the hollow shaft and the second end of the hollow shaft. Normally, the usable cross-section of a Dove prism is smaller than the height and the width of the Dove prism. Furthermore, some additional material or harness is required for the prism holder to hold the prism precisely at a predetermined position with respect to the center axis. An inner bore of the hollow shaft has to possess such a diameter that all the collimated beams from the collimator may be transmitted between the collimators and the Dove prism without being truncated. Due to the smaller usable cross-section of the Dove prism, the total cross-sectional area of the beams is significantly smaller than the height and the width of the Dove prism, and this area is further significantly smaller than the cross-section of the prism holder. As the bearings between the hollow shaft and the housing sections are on the first end and second end of the hollow shaft, but not on the prism holder, these bearings have an inner diameter which may be smaller than the outer diameter of the prism holder.

In a further embodiment, the bevel gear is a crown gear which may use crown wheels. Such a crown gear is a specific modification of a bevel gear, where the wheels are oriented an angle of 90 degrees with respect to their axis, and the teeth of the wheels are basically directed parallel to the axis.

A method for adjusting the bevel gear of an optical rotary joint (structured, for example, as that mentioned above) includes a first step, at which the whole unit is assembled by using means having a surface coating. The surface coating may have a predetermined coating thickness, which may be in the range between 1 µm and 30 µm. In a second step, the unit is disassembled and uncoated wheels or wheels with a thinner coating are inserted. Now, there is some mechanical play between the wheels due to the thickness difference between the thicker coating on the first set of wheels and the thinner coating on the second set of wheels. The so formed interval or spacing allows for lower movement forces and for better rotation of the wheels.

BRIEF DESCRIPTION OF THE DRAWINGS

In the following, the invention will be described by way of example, without limitation of the general inventive concept, on examples of embodiment and with reference to the drawings.

Figure 1:
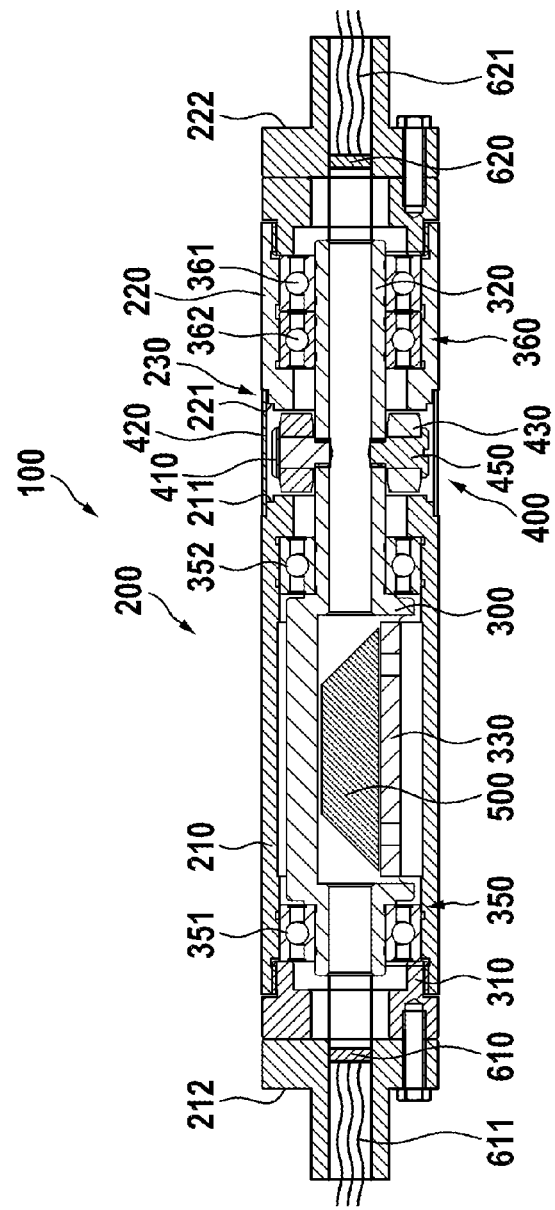
FIG. 1 shows a sectional view of a first embodiment.

Generally, the drawings are not to scale. Like elements and components are referred to by like labels and numerals. For the simplicity of illustrations, not all elements and components depicted and labeled in one drawing are necessarily labeled in another drawing even if these elements and components appear in such other drawing.

While various modifications and alternative forms of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

Figure 2:
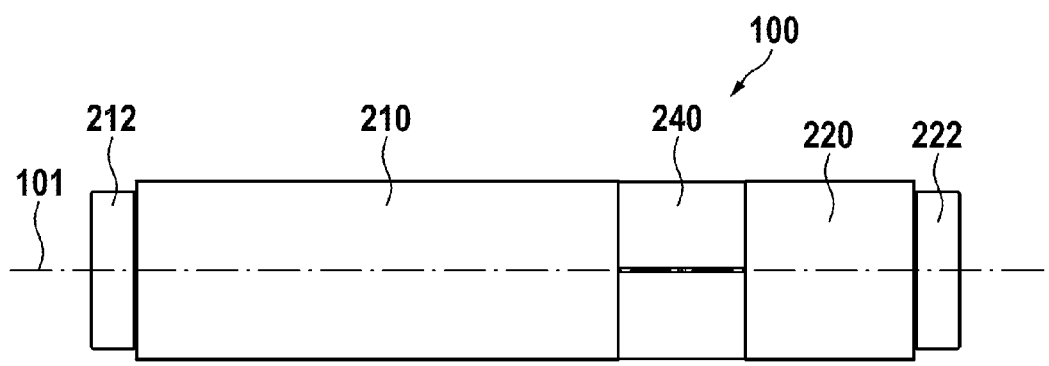
FIG. 2 illustrates an outer view of the rotary joint.
Figure 3:
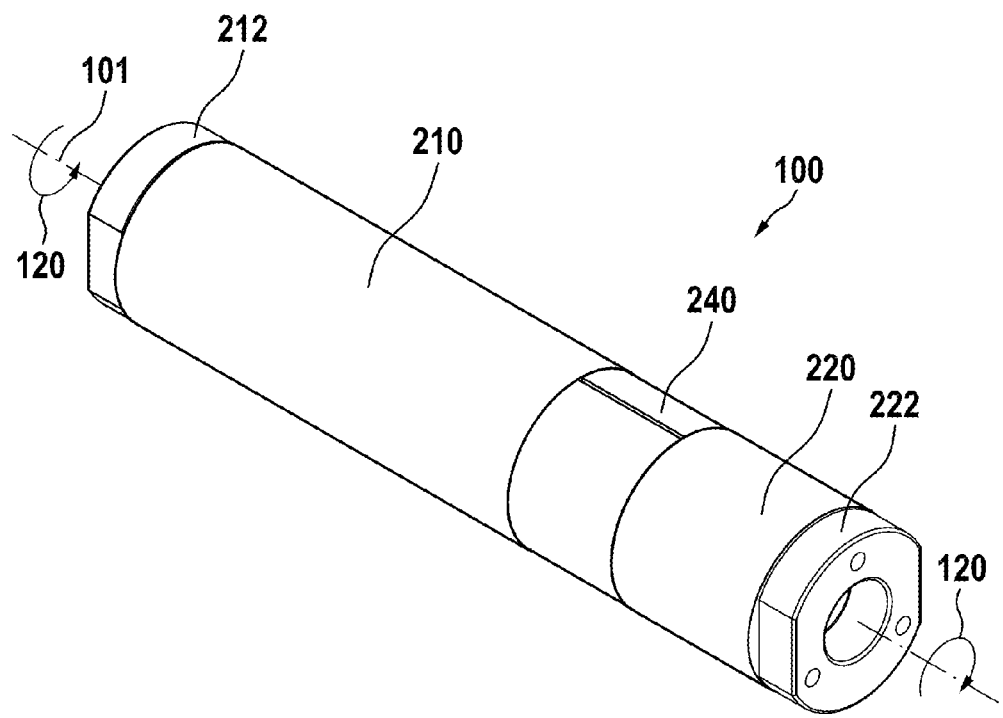
FIG. 3 presents a further outer view.

In reference to FIG. 1 (showing a sectional view of a first embodiment is shown) and FIGS. 2 and 3, the optical rotary joint 100 includes a housing 200, a hollow shaft 300, a bevel gear 400, a derotating element such as a prism 500, and two collimators 610, 620. The rotary joint has a center axis 101, which is also the rotation axis.

A first collimator 610 with first optical fibers 611 at a first side of the rotary joint and—opposing thereto at a second side of the rotary joint—a second collimator 620 having second optical fibers 621 define an optical path. Light coming from first optical fibers 611 is collimated by the first collimator 610 such that a parallel beam of light (which may have a larger diameter than the core diameter of a given optical fiber) is generated. This beam of light is guided through the hollow shaft 300 and the Dove prism 500 located therein. Here, for simplicity, the term of "Dove prism" is used. Of course, any other optical prism suitable for derotation or any other derotating element may be used. The beam of light is then collected by the second collimator 620 and coupled into a given second optical fiber 621. There may be one optical path from a first optical fiber to a second optical fiber or a plurality of optical paths from the plurality of first optical fibers to a plurality of second optical fibers. Basically, there may be any number of such optical paths. Generally, with the use of the structure 100 light may be coupled from the first side to the second side or vice versa from the second side to the first side. There may also be different directions of optical paths, such as a first path when coupling light from the fiber(s) 611 to the fiber(s) 621 (that is, from the first side to the second side of the joint 100) and a second, different path when coupling light from the fiber(s) 621 to the fiber(s) 611 (that is, from the second side to the first side of the joint 100).

The first collimator 610 is mounted to a first housing section 210 and the second collimator 620 is mounted to a second housing section 220. The first housing section 210 and the second housing section 220 are spaced apart—separated by a gap in an axial direction. The gap holds the bevel gear 400. The housing sections are independently rotatable against each other around the center axis. The first housing section 210 has in an axial direction a first inner side 211 and a first outer side 212. The second housing section 220 has in an axial direction a second inner side 221 and a second outer side 222. The first inner side 211 of the first housing section 210 is oriented towards the second inner side 221 of the second housing section 220.

The hollow shaft 300 is arranged essentially within the first housing section 210 and the second housing section 220. It is further aligned with the center axis 101. The hollow shaft 300 has a first end 310, which extends into the first housing section 210, and a second end 320, which extends into the second housing section 220. The first housing section 210 is supported on the first end of the shaft by at least a first bearing or bearing arrangement 350, and the second housing section is supported on the second end of the shaft by at least a second bearing or bearing arrangement 360. The at least one first bearing arrangement 350 may include two, three or four constituent bearings. In the shown example, it includes two first ball bearings 351, 352.

In an embodiment, a first outer ball bearing 351 is close to the first outer side 212 and a first inner ball bearing 352 is close to the first inner side 211. The prism holder and/or the prism is disposed between the first outer ball bearing 351 and the first inner ball bearing 352. In one embodiment, the bearings 351, 352 are axially distant from the prism holder and/or the prism. This results in high axial stability, further increasing coupling losses. As the bearings are axially distant from the prism, comparatively small and therefore precise bearings may be used, as the bearings must no more enclose the prism.

The at least one second bearing arrangement 360 may include two, three or four bearings. As shown, it includes two second ball bearings 361, 362.

The hollow shaft further has a prism holder 330 between the first and the second ends. The prism holder may be located within the first housing section 210 (as shown in this example).

The bevel gear 400 is located in the gap 230 between the first housing section 210 and the second housing section 220. The gear includes at least three wheels. A first wheel 410 is at the first inner side 211 of the first housing section 210. A second wheel 420 is at the second inner side 221 of the second housing section 220. At least one third wheel 430 is arranged such that it meshes with the first wheel 410 and the second wheel 420. The first wheel 410 and the second wheel 420 are coaxial with the center axis 101 and oppose each other such that the first wheel opposes the second wheel. In an embodiment, the first wheel and the second wheel may have the same size. These wheels may be configured to be substantially identical to each other. The at least one third wheel 430 has an axis 450, which is oriented radially to and with respect with the center axis. The axis 450 is fixedly attached to the hollow shaft 300 or is one part with the hollow shaft. To form the axis 450, a bolt or a screw may be used. Therefore, rotation of the housing sections against each other causing the first or second wheel to rotate will also cause the third wheel to rotate and to generate, thereby, a rotation of the hollow shaft around the center axis. The rotational speed of the hollow shaft is chosen to be precisely half the speed of the housing sections relative to each other (which is substantially defined by the operation of the Dove prism). As can be seen here, the bevel gear is displaced in axial direction from the prism holder, such that the axis of the third wheel in connection with the hollow shaft is short and the third wheel is close to the hollow shaft. As a result of this arrangement, the outer diameter of the rotary joint is small. The so-structured embodiment also keeps the rotating masses and the radii of the rotating masses small, such that the rotary joint can easily and quickly accelerate in its rotational operation. This further reduces forces to the rotary joint components and, therefore, maintains a longer lifetime while at the same time keeping the high precision of the rotary joint. Tests have shown that this design provides a long-term stable precision and, therefore, maintains lower transmission losses for longer periods of time. Furthermore, and due to the comparatively large overall length of the rotary joint, the bearings of the housing section (and specifically the housing section within which the Dove prism 50 is located) can be separated by large distances: this further ensures a large angular stability and therefore high precision of the rotary joint. The bevel gear may include a plurality of wheels. In this embodiment, two wheels opposing to each other are shown.

The prism holder 330 holds the prism 500 within the hollow shaft 300. Of course, the prism may also be mounted directly into the hollow shaft, but the use of an intermediate prism holder may allow for some adjustment of the prism.

In FIG. 2, an outer view of the rotary joint with the first housing section 210 and the second housing section 220 is shown. There may be a cover 240 covering the gap 230 and the bevel gear therein.

In FIG. 3, an outer view of the embodiment 100 is presented, further indicating the center axis 110, and the rotation of the first housing section 210 as well as the rotation of the second housing section 220 are schematically illustrated with arrows 120.

Figure 4:
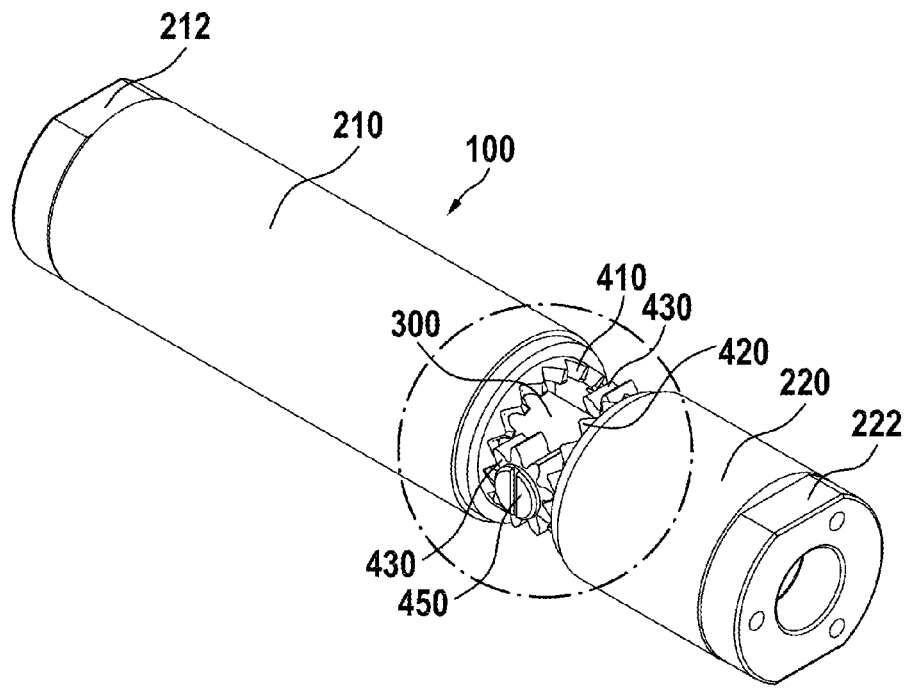
FIG. 4 shows an embodiment with removed cover.

FIG. 4 shows the embodiment of FIG. 3, but with removed cover 240. It shows the bevel gear which, in this case, is a special bevel gear embodiment, called a crown gear. In a crown gear, the pitch cone angle is 90 degrees. Further details are explained in reference to the next figure.

Figure 5:
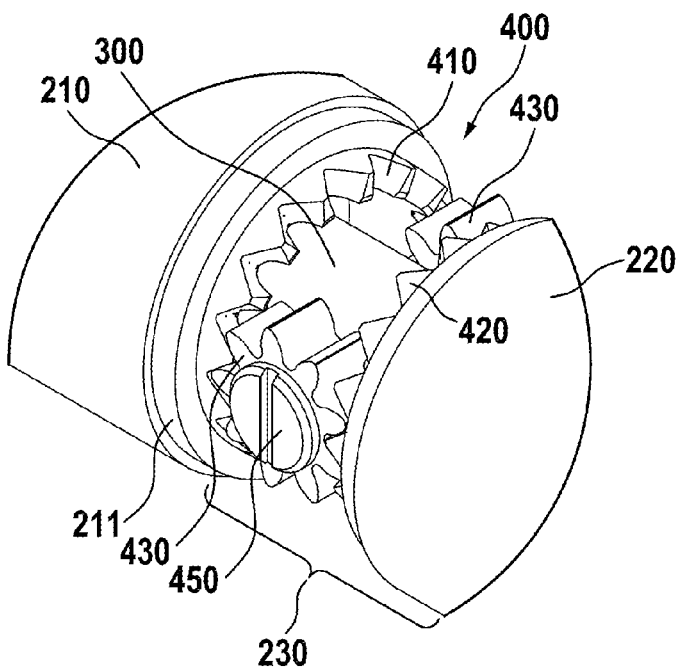
FIG. 5 depicts details of the gear.

FIG. 5 shows details of the bevel gear (the crown gear). The bevel gear 400 is located in the gap 230 between the first housing section 210 and the second housing section 220. The gear includes at least three wheels. A first wheel 410 is at the first inner side 211 of first housing section 210. A second wheel 420 is at the second inner side 221 of the second housing section 220. At least one third wheel 430 is arranged such that it meshes with the first wheel 410 and the second wheel 420. The first wheel 410 and the second wheel 420 are coaxial with respect to the center axis 101 and oppose each other such that the first wheel opposes the second wheel. Here, the first wheel 410 and the second wheel 420 may be substantially equally dimensioned (have the same size). In a specific embodiment, they may be substantially identical to each other. This FIG. 5 shows two third wheels 430, one at the front of the Figure and one opposing thereto, at the rear portion of the Figure. Each third wheel 430 has a corresponding axis 450, oriented radially to the center axis 101. A given axis 450 is fixedly attached to the hollow shaft 300 or is one part with the hollow shaft. In this example, the axis 450 is shown to be formed by a bolt or a screw. Both third wheels 430 in this example may be configured to have the same bolt- or screw-based axis 450. (In an alternative arrangement, each of the third wheels may be made rest on a respectively-dedicated axis 450). Therefore, rotation of the housing sections against each other causing the first or second wheel to rotate also causes a given third wheel 430 to rotate and to generate a rotation of the hollow shaft around the center axis.

It will be appreciated to those skilled in the art having the benefit of this disclosure that this invention is believed to provide an optical rotary joint. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

100 optical rotary joint
101 center axis
110 rotation of first housing section
120 rotation of second housing section
200 housing
210 first housing section
211 first inner side
212 first outer side
220 second housing section
221 second inner side
222 second outer side
230 gap
240 cover
300 hollow shaft
310 first end
320 second end
330 prism holder
350 first bearing
351, 352 first ball bearings
360 second bearing
361, 362 second ball bearings
400 bevel gear
410 first wheel
420 second wheel
430 third wheels
450 axis of third wheels
500 prism
610 first collimator
611 first optical fibers
620 second collimator
621 second optical fibers

The invention claimed is:

1. An optical rotary joint comprising:
a housing, a hollow shaft, a bevel gear, a prism, and two optical collimators;
the rotary joint having a center axis,
the housing comprising a first housing section and a second housing section separated in an axial direction from the first housing section;
the first housing section and the second housing section being rotatable against each other and around the center axis,
the first housing section having, in the axial direction, a first inner side and a first outer side,
the second housing section having, in the axial direction, a second inner side and a second outer side,
the first inner side being oriented towards the second inner side,
a first collimator, of the two optical collimators, is arranged at the first outer side and a second collimator, of the two optical collimators, is arranged at the second outer side,
the hollow shaft being aligned with the center axis,
the hollow shaft having a first end extending into the first housing section and a second end extending into the second housing section,
the first end of the hollow shaft providing support for at least a first bearing, the first bearing further providing support to the first housing section, and
the second end of the hollow shaft providing support for at least a second bearing, the second bearing providing support to the second housing section,
the hollow shaft having a prism holder between the first end and the second end, wherein the prism holder is located within the first housing section,
the bevel gear comprising a first wheel, a second wheel, and at least one third wheel and located in the gap between the first housing section and the second housing section,
wherein:
the first wheel is coaxial with the center axis at the first inner side of the first housing section, the second wheel is coaxial with the center axis, opposes the first wheel at the second inner side of the second housing section, and has the same diameter as the first wheel, the at least one third wheel is between the first wheel and the second wheel and in mesh with the first wheel and the second wheel, the at least one third wheel has an axis that is oriented radially with respect to the center axis and that is fixedly attached to or one part with the hollow shaft, such that a rotation of the first housing section against the second housing section at a first angular speed results in a rotation of the hollow shaft at half of the first angular speed, and wherein the bevel gear is displaced in the axial direction from the prism holder, and the prism is located in the prism holder of the hollow shaft.

2. The optical rotary joint according to claim 1, wherein the bevel gear is a crown gear.

3. The optical rotary joint according to claim 1, wherein the bevel gear comprises 2, 3 or 4 third wheels.

4. The optical rotary joint according to claim 1, wherein the at least one third wheel has a smaller diameter than that of the first wheel.

5. The optical rotary joint according to claim 1, wherein the at least one third wheel has a friction bearing or plain bearing.

6. The optical rotary joint according to claim 1, wherein the housing has a cylindrical shape.

7. The optical rotary joint according to claim 1, wherein an outer diameter of the first housing section is equal to an outer diameter of the second housing section.

8. The optical rotary joint according to claim 1, wherein the housing includes a cover on the gap.

9. The optical rotary joint according to claim 1, wherein the prism is a Dove prism or an Abbe-Koenig prism.

10. The optical rotary joint according to claim 1, wherein an outer diameter of the prism holder is larger than an outer diameter of the first end and than an outer diameter of the second end of the hollow shaft.

11. The optical rotary joint according to claim 1, wherein at least one of the first bearing and second bearing comprises a ball bearing.

12. The optical rotary joint according to claim 1, wherein the first bearing and the second bearing are displaced in the axial direction from the prism holder.

13. The optical rotary joint according to claim 1, wherein an inner diameter of the first bearing and an inner diameter of the second bearing are smaller than an outer diameter of the prism holder.

14. The optical rotary joint according to claim 1, wherein at least one of the first and second bearings is at each side of the prism holder.

15. The optical rotary joint according to claim 3, wherein said third wheels of the bevel gear are arranged equidistantly around the hollow shaft.

* * * * *